(12) United States Patent
Lancaster

(10) Patent No.: US 11,922,464 B2
(45) Date of Patent: *Mar. 5, 2024

(54) SPONSOR DRIVEN DIGITAL MARKETING FOR LIVE TELEVISION BROADCAST

(71) Applicant: BRANDACTIF LTD., Hampsthwaite (GB)

(72) Inventor: Peter Lancaster, Singapore (SG)

(73) Assignee: BRANDACTIF LTD. (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/114,487

(22) Filed: Feb. 27, 2023

(65) Prior Publication Data

US 2023/0222553 A1 Jul. 13, 2023

Related U.S. Application Data

(63) Continuation of application No. 17/747,470, filed on May 18, 2022, now Pat. No. 11,593,843, which is a (Continued)

(30) Foreign Application Priority Data

Mar. 3, 2020 (SG) .............. 10202001898S

(51) Int. Cl.
*G06Q 30/0251* (2023.01)
*H04H 20/38* (2008.01)
(Continued)

(52) U.S. Cl.
CPC ......... *G06Q 30/0271* (2013.01); *H04H 20/38* (2013.01); *H04H 20/93* (2013.01);
(Continued)

(58) Field of Classification Search
None
See application file for complete search history.

(56) References Cited

U.S. PATENT DOCUMENTS

| 5,188,624 | A | 2/1993 | Young, Sr. et al. |
| 5,661,517 | A | 8/1997 | Budow et al. |

(Continued)

FOREIGN PATENT DOCUMENTS

| CN | 101600118 B | 9/2012 |
| CN | 106127469 A | 11/2016 |

(Continued)

*Primary Examiner* — Ricky Chin
(74) *Attorney, Agent, or Firm* — Manatt, Phelps & Phillips, LLC

(57) ABSTRACT

A system and method facilitate digital marketing for sponsors of live television broadcasts. The system allows a user, using an application on a computing device while a piece of sponsored content is being broadcast, to express an interest in the broadcast piece of sponsored content and the interest of the user is communicated to a backend system that selects an endpoint destination associated with the broadcast piece of sponsored content wherein the endpoint destination is a pointer to further digital information about the broadcast piece of sponsored content. The system and method may periodically change the selected endpoint destination based on an event in the sponsored piece of content.

16 Claims, 9 Drawing Sheets

Related U.S. Application Data continuation-in-part of application No. 17/097,970, filed on Nov. 13, 2020, now Pat. No. 11,301,906, which is a continuation of application No. 16/865,109, filed on May 1, 2020, now Pat. No. 11,373,214.

(51) Int. Cl.
  *H04H 20/93* (2008.01)
  *H04H 60/37* (2008.01)
  *H04N 21/442* (2011.01)

(52) U.S. Cl.
  CPC ...... *H04H 60/37* (2013.01); *H04N 21/44209* (2013.01); *H04N 21/44218* (2013.01); *H04N 21/44222* (2013.01)

(56) References Cited

U.S. PATENT DOCUMENTS

| | | |
|---|---|---|
| 5,854,894 A | 12/1998 | Lancaster et al. |
| 5,918,012 A * | 6/1999 | Astiz .................. G06F 16/94 |
| | | 715/744 |
| 6,175,663 B1 | 1/2001 | Huang |
| 6,587,899 B1 | 7/2003 | Huang |
| 6,826,727 B1 | 11/2004 | Mohr et al. |
| 6,914,593 B2 | 7/2005 | Lapstun et al. |
| 7,030,642 B2 | 4/2006 | Butsch et al. |
| 7,406,603 B1 | 7/2008 | MacKay et al. |
| 7,466,444 B2 | 12/2008 | Silverbrook et al. |
| 7,495,795 B2 | 2/2009 | Graham et al. |
| 7,739,583 B2 | 6/2010 | Barrus et al. |
| 7,746,498 B2 | 6/2010 | Lapstun et al. |
| 7,812,986 B2 | 10/2010 | Graham et al. |
| 7,930,642 B1 | 4/2011 | Gerde et al. |
| 7,962,691 B2 | 6/2011 | Nishihara |
| 7,982,898 B2 | 7/2011 | Lapstun et al. |
| 7,991,778 B2 | 8/2011 | Hull et al. |
| 8,090,628 B2 | 1/2012 | Shinohara et al. |
| 8,156,427 B2 | 4/2012 | Graham et al. |
| 8,271,413 B2 | 9/2012 | Agarwal et al. |
| 8,310,985 B2 | 11/2012 | Harb |
| 8,332,401 B2 | 12/2012 | Hall et al. |
| 8,335,789 B2 | 12/2012 | Hull et al. |
| 8,385,660 B2 | 2/2013 | Moraleda et al. |
| 8,390,648 B2 | 3/2013 | Ptucha et al. |
| 8,438,485 B2 | 5/2013 | Kulis et al. |
| 8,601,526 B2 | 12/2013 | Nishimura et al. |
| 8,610,730 B1 | 12/2013 | Li |
| 8,635,531 B2 | 1/2014 | Graham et al. |
| 8,681,243 B2 | 3/2014 | Nozaki et al. |
| 8,682,722 B1 | 3/2014 | Jardins |
| 8,782,135 B2 | 7/2014 | Roman |
| 8,797,604 B2 | 8/2014 | Hannaway et al. |
| 8,843,963 B2 | 9/2014 | Boylan, III et al. |
| 8,867,106 B1 | 10/2014 | Lancaster |
| 8,918,333 B2 | 12/2014 | Harb |
| 9,036,043 B2 | 5/2015 | Segal |
| 9,092,291 B1 | 7/2015 | Adib et al. |
| 9,219,840 B2 | 12/2015 | Ashbrook et al. |
| 9,223,782 B2 | 12/2015 | Ashbrook et al. |
| 9,253,513 B1 | 2/2016 | Finster |
| 9,319,640 B2 | 4/2016 | Ptucha et al. |
| 9,332,302 B2 | 5/2016 | Briggs |
| 9,338,493 B2 | 5/2016 | van Os et al. |
| 9,363,448 B2 | 6/2016 | Segal |
| 9,418,294 B2 | 8/2016 | Ashbrook et al. |
| 9,448,625 B2 | 9/2016 | Kobayashi |
| 9,652,783 B2 | 5/2017 | Roberts et al. |
| 9,656,492 B2 | 5/2017 | Leynadier et al. |
| 9,659,313 B2 | 5/2017 | Tsai et al. |
| 9,715,629 B2 | 7/2017 | Ashbrook et al. |
| 9,716,918 B1 | 7/2017 | Lockton |
| 9,754,623 B2 | 9/2017 | Lancaster |
| 9,979,758 B2 | 5/2018 | Duncker et al. |
| 10,089,550 B1 | 10/2018 | Otte |
| 10,120,944 B2 | 11/2018 | Hu et al. |
| 10,142,687 B2 | 11/2018 | Gurha |
| 10,158,722 B2 | 12/2018 | Eschbach et al. |
| 10,231,033 B1 | 3/2019 | Bumgarner |
| 10,291,947 B2 | 5/2019 | Bhatia et al. |
| 10,445,618 B2 | 10/2019 | Ashbrook et al. |
| 10,504,556 B2 | 12/2019 | Lancaster |
| 11,069,379 B2 | 7/2021 | Lancaster |
| 2002/0184091 A1 | 12/2002 | Pudar |
| 2003/0070167 A1 | 4/2003 | Holtz |
| 2004/0019497 A1 | 1/2004 | Volk |
| 2004/0032424 A1 | 2/2004 | Florschuetz |
| 2004/0047294 A1 | 3/2004 | Ain et al. |
| 2005/0246590 A1 | 11/2005 | Lancaster |
| 2005/0278736 A1 | 12/2005 | Steelberg |
| 2006/0080171 A1 | 4/2006 | Jardins |
| 2006/0136549 A1 | 6/2006 | Carro |
| 2007/0288976 A1 | 12/2007 | Redling et al. |
| 2008/0167992 A1 | 7/2008 | Kokernak |
| 2008/0260352 A1 | 10/2008 | Turner |
| 2008/0262911 A1 | 10/2008 | Altberg |
| 2008/0318529 A1 | 12/2008 | Harb |
| 2009/0047000 A1 | 2/2009 | Walikis |
| 2009/0061763 A1 | 3/2009 | Dillon et al. |
| 2009/0150941 A1 | 6/2009 | Riedl |
| 2009/0210790 A1 | 8/2009 | Thomas |
| 2009/0265734 A1 | 10/2009 | Dion |
| 2010/0063931 A1 | 3/2010 | Cole |
| 2010/0146135 A1 | 6/2010 | Evans |
| 2010/0195623 A1 | 8/2010 | Narasimhan |
| 2010/0280641 A1 | 11/2010 | Harkness et al. |
| 2010/0280921 A1 | 11/2010 | Stone et al. |
| 2010/0286490 A1 | 11/2010 | Koverzin |
| 2011/0035394 A1 | 2/2011 | Ashbrook et al. |
| 2011/0179356 A1 | 7/2011 | Bassali |
| 2011/0247035 A1 | 10/2011 | Adimatyam |
| 2011/0320278 A1 | 12/2011 | Littman |
| 2012/0066386 A1 | 3/2012 | McGowan |
| 2012/0072943 A1 | 3/2012 | Pan |
| 2012/0085819 A1 | 4/2012 | Choi |
| 2012/0159327 A1 | 6/2012 | Law et al. |
| 2012/0173388 A1 | 7/2012 | Odinak et al. |
| 2012/0274105 A1 | 11/2012 | Chen et al. |
| 2012/0317492 A1 | 12/2012 | Sheeder |
| 2013/0034147 A1 | 2/2013 | Ballout |
| 2013/0036007 A1 | 2/2013 | Lau et al. |
| 2013/0173402 A1 | 7/2013 | Young et al. |
| 2013/0191749 A1 | 7/2013 | Coburn, IV |
| 2013/0198772 A1 | 8/2013 | Wang |
| 2013/0212619 A1 | 8/2013 | Yerli |
| 2013/0254159 A1 | 9/2013 | Thramann |
| 2013/0332963 A1 | 12/2013 | Cheung |
| 2013/0346599 A1 | 12/2013 | Wilson |
| 2014/0036086 A1 | 2/2014 | Gabriel |
| 2014/0068662 A1 | 3/2014 | Kumar |
| 2014/0164091 A1 | 6/2014 | Hunt |
| 2014/0198033 A1 | 7/2014 | Kobayashi |
| 2014/0245346 A1 | 8/2014 | Cheng |
| 2015/0033255 A1 | 1/2015 | Neumann |
| 2015/0067748 A1 | 3/2015 | Kang |
| 2015/0149585 A1 | 5/2015 | Zhang |
| 2015/0162997 A1 | 6/2015 | Francois |
| 2015/0181269 A1 * | 6/2015 | McMillan ........ H04N 21/23418 |
| | | 725/19 |
| 2015/0199084 A1 | 7/2015 | Velusamy |
| 2015/0213439 A1 | 7/2015 | Kramer |
| 2015/0270318 A1 | 9/2015 | Bhintade |
| 2015/0271234 A1 | 9/2015 | O'Malley |
| 2015/0294366 A1 | 10/2015 | Oberbrunner et al. |
| 2015/0312302 A1 | 10/2015 | Gupta |
| 2015/0358790 A1 | 12/2015 | Nasserbakht |
| 2016/0094302 A1 | 3/2016 | Berner |
| 2016/0182923 A1 | 6/2016 | Higgs et al. |
| 2016/0192001 A1 | 6/2016 | White et al. |
| 2016/0316233 A1 | 10/2016 | Ghadi |
| 2016/0351062 A1 | 12/2016 | Mathews |
| 2017/0013314 A1 * | 1/2017 | Mallinson ............ H04N 21/218 |
| 2017/0178097 A1 | 6/2017 | Karnik |
| 2017/0200193 A1 | 7/2017 | Bigley |

(56) References Cited

U.S. PATENT DOCUMENTS

| | | |
|---|---|---|
| 2017/0272816 A1 | 9/2017 | Olds |
| 2018/0035152 A1 | 2/2018 | Jassin |
| 2018/0054639 A1 | 2/2018 | Rosqvist |
| 2018/0122378 A1 | 5/2018 | Mixter et al. |
| 2018/0190264 A1 | 7/2018 | Mixter et al. |
| 2018/0261223 A1 | 9/2018 | Jain et al. |
| 2018/0343495 A1 | 11/2018 | Loheide |
| 2019/0066190 A1 | 2/2019 | Pedroso et al. |
| 2019/0273954 A1* | 9/2019 | Evans .............. H04N 21/25883 |
| 2019/0313135 A1 | 10/2019 | Pathak |
| 2020/0104844 A1 | 4/2020 | Herrington et al. |
| 2020/0111508 A1 | 4/2020 | Lancaster |
| 2020/0151702 A1 | 5/2020 | Sinha |
| 2020/0242585 A1 | 7/2020 | Meere et al. |
| 2020/0245017 A1* | 7/2020 | Ganschow ......... H04N 21/4312 |
| 2020/0285854 A1 | 9/2020 | Merchant |
| 2021/0044863 A1* | 2/2021 | Haifa ............... H04N 21/44016 |
| 2021/0342891 A1 | 11/2021 | Lancaster |

FOREIGN PATENT DOCUMENTS

| | | |
|---|---|---|
| CN | 103905846 B | 12/2017 |
| EP | 1847112 B1 | 6/2013 |
| GB | 2370456 | 6/2002 |
| WO | WO2002082351 A1 | 10/2002 |
| WO | WO2005/039080 A1 | 4/2005 |
| WO | WO2014/150073 A2 | 9/2014 |

\* cited by examiner

802

| S1 | A1 | A2 | S2 | A3 | ... | SN |
|----|----|----|----|----|-----|----|
| t0 | t1 | t2 | t3 | t4 | t5  | tn-1 tn |

| D1 | P1 | D2 | ... | P2 |
|----|----|----|-----|----|
| t0 | t1 | t2 | t3  | tn-1 tn |

| A1 | C1 | A2 | ... | CN |
|----|----|----|-----|----|
| t0 | t1 | t2 | t3  | tn-1 tn |

FIGURE 8C

SPONSOR DRIVEN DIGITAL MARKETING FOR LIVE TELEVISION BROADCAST

RELATED APPLICATIONS

This application is a continuation of and claims priority under 35 USC 120 to U.S. patent application Ser. No. 17/747,470 filed May 18, 2022 (to be issued as U.S. Pat. No. 11,593,843 on Feb. 28, 2023) that is in turn a continuation in part and claims priority under 35 USC 120 to U.S. patent application Ser. No. 17/097,970 filed Nov. 13, 2020 that in turn is a continuation and claims priority under 35 USC 120 to U.S. patent application Ser. No. 16/865,109 filed May 1, 2020 that in turn claims priority and the benefit under 35 USC 119 to Singapore Patent Application No. 10202001898S filed Mar. 3, 2020, all of which are incorporated herein by reference.

FIELD

The disclosure relates generally to a system and method for digital marketing and the provision of digital content. While the present disclosure will be described in relation to its application in relation to live television broadcasts, it is to be appreciated that the present disclosure is not limited to this application, and is also applicable for other forms of media broadcasts including, but not restricted to, digital radio and analog and digital television broadcasts.

BACKGROUND

The following discussion of the background is intended to facilitate an understanding of the system. It should be appreciated that the discussion is not an acknowledgement or admission that any of the material referred to was published, known or part of the common general knowledge of the person skilled in the art in any jurisdiction.

Systems exist that provide personalized offers and advertisements to a user in various manners. However, those systems do not provide personalized offers and advertisements for all of the different types of communications mediums. For example, communication mediums can include radio or television (both over the air and digitally) in which commercials and advertisements are presently orally to each audience member who is listening to a particular radio station or viewing a particular television station. It is desirable to be able to permit each audience member to identify a commercial or advertisement in the broadcast and then provide a personalized offer to that audience member and it is to this end that the disclosure is directed.

BRIEF DESCRIPTION OF THE DRAWINGS

FIGS. 8A-8C illustrates examples of playlists for different types of broadcast content.

DETAILED DESCRIPTION OF ONE OR MORE EMBODIMENTS

Figure 1:
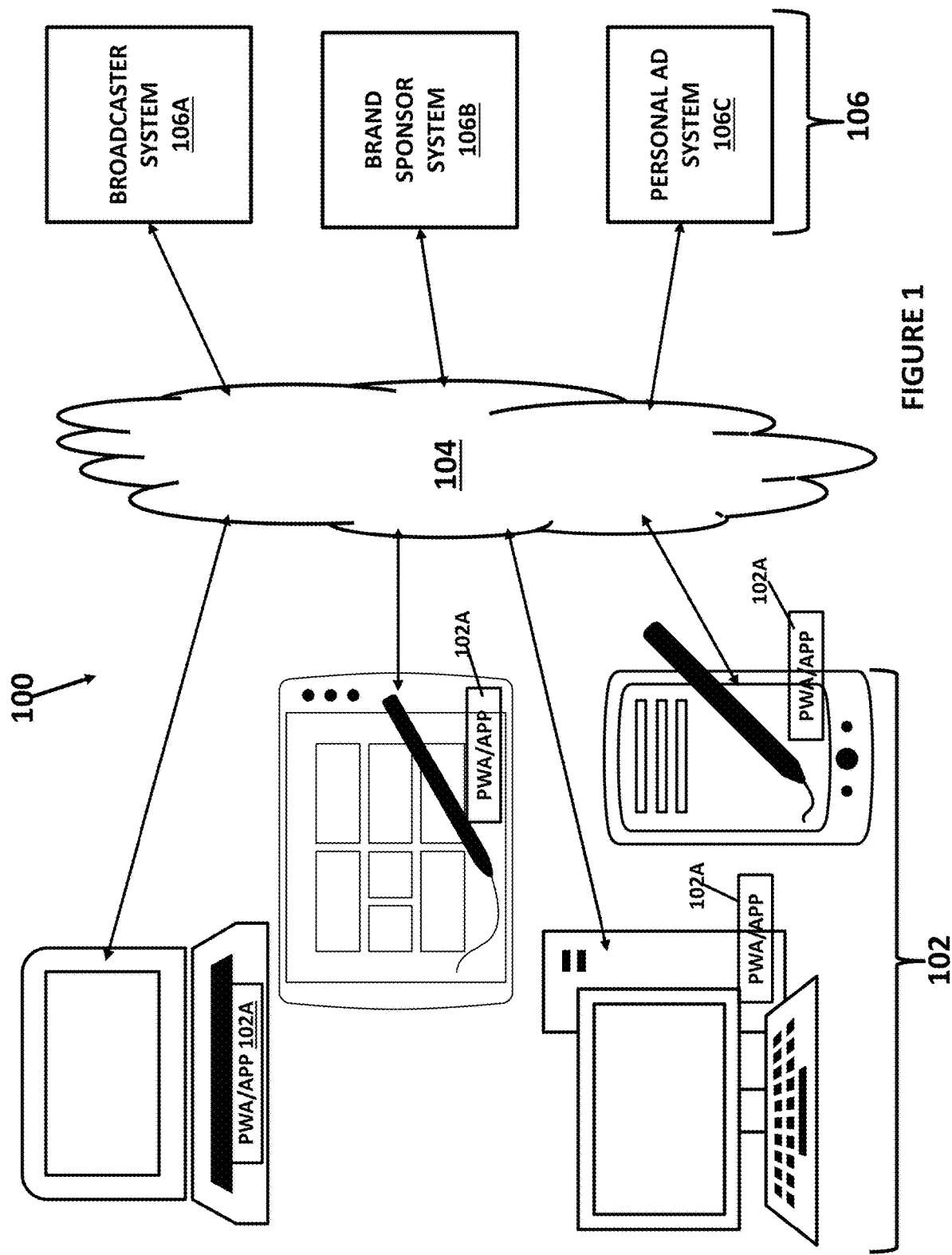
FIG. 1 illustrates an example of a cloud based implementation of a live television broadcast sponsor driven system that facilitates digital marketing.

The disclosure is particularly applicable to use with live television broadcasts in which digital marketing is driven by a sponsor of the live television broadcast and it is in this context that the disclosure will be described. It will be appreciated, however, that the system and method has greater utility and could be used with other types of broadcast systems for pieces of content. Furthermore, while the system and method are described in the context of a live broadcast of a sporting event, such as a the World Cup, and its sponsors, it is understood that the system and method may be used with any live television or radio broadcast piece of content and various different sponsors.

According to an aspect of the present disclosure, there is provided a method, comprising: providing a television broadcast system that broadcasts a piece of sponsored content through at least one station, wherein the at least one station schedules the piece of sponsored content according to a play list, determining a set of timestamps for the piece of sponsored content, the set of timestamps indicating a time during the piece of sponsored content that a user expressed an interest in the piece of sponsored content, providing a backend system configured to access and store the set of timestamps for the piece of sponsored content and store a plurality of endpoint destinations for the piece of sponsored content, each endpoint destination being a pointer to further digital information about a sponsor product or service associated with the piece of sponsored content, providing an app associated with the sponsor, the app having a station identifier for the particular station that links the app to the piece of sponsored content, periodically, during the broadcast of the piece of sponsor content, select an endpoint assigned to each event in the piece of sponsor content wherein the endpoint is selected from the plurality of endpoint destinations, expressing, by the user using the sponsor app while a piece of content is being broadcast by the particular station, an interest in the piece of sponsor content wherein the expressed interest data includes the station identifier for the piece of sponsor content, communicating the expressed interest in the broadcast piece of content to the backend system via a computing device, identifying at the backend system, the selected endpoint destination and verifying that the expressed interest occurred between a start time and an end time of the piece of sponsored content and communicating, by the backend system to the computing device, the selected endpoint destination for the piece of sponsor content. A system that implements the above method is also provided.

In some embodiments, the method further comprises providing, by a digital marketing system in the backend system connected to the computing device, a personalized offer associated with the live television broadcast sponsored piece of content and displaying, on a display of the computing device, the personalized offer to the user. In various embodiments, the personalized offer for each user may be determined using permission based contextual and personalized metadata. For example, for an airline sponsor, the personalized offer may be determined based on personalized metadata or permission based contextual information that the sponsor already has for the user, such as the user's status in the airline's mileage/reward program, the user's residence, etc. Similarly, for the other sponsor use cases below, the personalized offers may be based on user data already captured by the sponsor with permission from the user.

In some embodiments, to determine the timestamps, the method may have each broadcaster upload a playlist for the broadcast to the backend system wherein the playlist has one or more pieces of sponsored content and the backend system stores an association of each piece of sponsored content in the broadcast with a particular end point destination. Providing the playlist may further comprise providing, for each piece of sponsored content in the broadcast, a start time and an end time for each piece of sponsored content.

In some embodiments, the method further comprises activating the endpoint destination for each piece of sponsored content for the live broadcast at the start time and deactivating the endpoint destination at the end time and wherein expressing interest for the broadcast piece of sponsored content further comprises expressing interest in the piece of sponsored content while the endpoint destination is active.

In some embodiments, the application/app executed on the computing device is one of a progressive web application (PWA) or an application downloaded to the computing device. In some embodiments, the endpoint destination is a uniform resource locator (URL) to a webpage having digital information about the broadcast piece of sponsored content or content in an application having digital information about the broadcast piece of sponsored content. In some embodiments, the application executed on the computing device broadcasts the live television signal. In some embodiments, the live television signal is broadcast by a device separate from the computing device.

The disclosure can be applicable to a live television system that uses an application or website to digitally deliver content to a user based on the broadcast signal with a computing device and a personal offer system that can provide a personal offer using a progressive web application (PWA) to the user based on the pieces of sponsored content being broadcast by the television station and it is in this context that the disclosure will be described. It will be appreciated, however, that the system and method has greater utility since: 1) the personalized offer system may be implemented on a computing device using other known or yet to be developed technology in lieu of the progressive web application; 2) the system and method may be used with other types of content other than live television content delivered over the air, and can include digitally delivered radio and television as well as television delivered over the air; and 3) the personalized offer system may be implemented on other devices that are capable to performing the processes described below including a virtual reality device or headset, a pair of glasses with embedded computer functionality and the like. The system and method may also be implemented using an application or mobile application rather than a PWA. Furthermore, the system and method described below may be used with various content broadcasts that may be delivered to a user as a live radio or television broadcast (either over the air or over a computer network), a streaming broadcast, a catch-up service broadcast, a podcast and the like. Furthermore, the system may be used with digital broadcasts or analog broadcasts of content to the user.

The system may for example be used for a live television broadcast being played in any location (car, shop, supermarket, bar, etc.), through a TV channel or through the app/PWA on the computing device. Furthermore, background noise does not affect the efficacy of the system since the system does not rely on capturing the signal in order to determine the timestamps. The system allows a user to watch a live television signal (generated by whatever device) and react/express interest about a piece of content in the broadcast using a PWA or application executing on the computing device (that may or may not be also presenting the live television signal to the user) wherein the user is delivered an endpoint destination to the PWA or application based on the particular piece of content. The endpoint destination in turn directs the user to further sponsor information about the piece of sponsored content. In a number of countries, a company that owns at least one radio station also owns other media such as television or magazines and the system described herein can be used to provide information about products on the other media using the endpoint destinations.

FIG. 1 illustrates an example of a cloud based implementation of a live television sponsored broadcast system 100 that links, in one embodiment, a sponsor of a live television broadcast to the digital world (and digital marketing) through a PWA or application on a computing device of a user.

The system 100 may have one or more computing devices 102 that may connect to and communicate over a communication path 104 with one or more backend systems 106 in order to provide sponsor digital marketing for a live television broadcast so that a user of the computing device 102 may interact with (hear or see, etc.) a piece of sponsored content (whether over the air or digital or streaming) and the user may indicate an interest in the piece of sponsored content currently being broadcast, such as the live television broadcast that may be a live sporting event. The system may communicate, back to the computing device, an endpoint destination that is associated with the piece of sponsored content, such as one or more personalized details/offers or other information. In this system, the backend system may have a plurality of endpoint destinations for a sponsor in which the backend system may periodically change the endpoint destination selected for the user based on an event of the live television broadcast. For example, the backend system may change the endpoint destination when an event (touchdown, goal, etc.) occurs during the live television broadcast and/or each time a predetermined period of time elapses during the live television broadcast. In this manner, each user of each computing device 102 may watch/listen to the live television broadcast by a particular radio station, using the application, and receive the selected endpoint destination related to the piece of sponsored content to each user. Alternatively, the live television signal also may be broadcast by a separate device, such as a television or media player.

Each computing device 102 may be a processor based device with memory, a display, an input device and connectivity circuits wherein the display may generate and display a user interface (see FIG. 4 for an example of the sponsor app on the computing device 102) so that the user can indicate interest in a particular piece of sponsored content broadcast by a station and display the one or more personalized offers or other information based on the endpoint destination. The input device of the computing device 102 allows the user to interact with the user interface and the connectivity circuits may permit the computing device to connect and communicate wirelessly or over a wired line with the backend systems 106. For example, each computing device 102 may be a laptop computer, a tablet computer, a smartphone device, such as an Apple iPhone or an Android OS based device or a personal computer as shown in FIG. 1. To interact with the television station to indicate the interest in the piece of sponsored content, receive the endpoint destination and follow the endpoint destination, each computing device 102 may have an application/app 102A that is a plurality of lines of instructions or computer code that are stored in the memory of the computing device and executed by the processor to generate the user interface as described below. Each application may be a mobile application or other application. In one embodiment, each application 102A may be a branded sponsor App/progressive web app (PWA) that may be available, for example, on Android Auto/Apple Car Play. In one embodiment, the computing device 102 may be a processor based device that has limited capabilities, but does have access to the Internet and the system allows the user of this limited capability device to indicate an interest in content on the television and receive digital marketing as a result of that expressed interest. For example, many computing devices 102 in India are feature phones that have limited capabilities, such as no ability to download apps, but has internet access and thus can use the PWA to indicate an interest in content on the television and receive digital marketing as a result of that expressed interest. In one illustrative embodiment, the live television may be a live sporting event, such as a soccer game, football game, baseball game, cricket game, etc. that is sponsored by a particular sponsor wherein the system presents different endpoint destinations for the particular sponsor to the user. As discussed above, the endpoint destination selected for each user may change based on an event associated with the live sporting event. In the live sporting event example, the event associated with the live sporting event may be a scoring event (goal, touchdown, try, run, etc.), other events during the sporting event or an elapsed period of time during the sporting event.

The communication path 104 may be a wired link or a wireless link or a combination thereof that uses known communication and data transfer protocols that allow each computing device 102 to connect to and communicate with the backend systems 106.

The backend systems 106 may include one or more computing resources, such as a server computers, blade servers, cloud computing resources, etc. In more detail, the backend systems 106 may include, in an embodiment in which the live television is digital or streamed, one or more television broadcast system servers 106A that deliver a broadcast (such as digital or analog or a stream) to each computing device 102 and more specifically to an app 102A or to a television. Each broadcast system server 106A may be owned by a third party and the system 100 can provide its digital marketing service to a plurality of broadcast systems 106A. The backend systems 106 may further include one or more brand sponsor system 106B servers operated by a brand, such as Coca-Cola or Emirates airlines, that sponsors a piece of sponsored content (and displays ads or other content as a result of the sponsorship) being broadcast by one or more broadcast systems. In one embodiment, the brand sponsor may sponsor a live television broadcast, such as a live sporting event, and a personal ad system 106C may capture a user interest in the piece of sponsored content and deliver an endpoint destination for the sponsor to the user regardless of which broadcast system or broadcaster is broadcasting the live television broadcast. Each brand sponsor system 106B may also store and manage the branding campaign of the brand (including for the live television broadcast) and provide content/locations of content to the personal ad system 106C that can associate endpoint destinations with the content/location of content.

The backend systems 106 may further include a personal ad system server 106C that: 1) receives brand/sponsor content/content location from the brand system 106B; 2) receives an interest indication from each user of each computing device using the app; 3) selects the endpoint destination for the sponsor (such as customized offers) for each user based on the interest indication; 4) change the endpoint destinations and content of the sponsor periodically based on an event of the live television broadcast; 5) delivers the endpoint destination to the user; and 6) permits the user to access the endpoint destination as described below. The further information resulting from the end point destination, such as one or more customized offers, may be displayed to the user on the app 102A or via a dynamic web page such as using a PWA.

Figure 2:
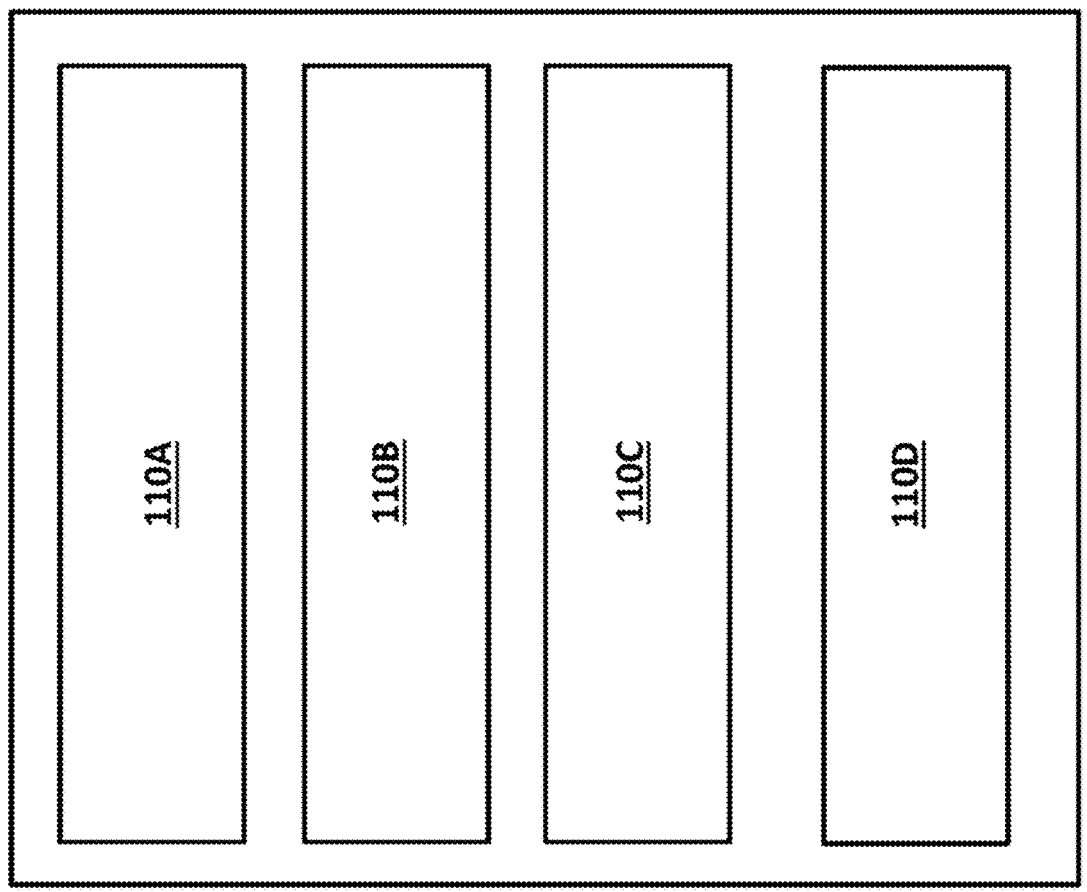
FIG. 2 illustrates more details of the preferred implementation of the personal ad system shown in FIG. 1.

FIG. 2 illustrates more details of the preferred implementation of the personal ad backend system 106C shown in FIG. 1. In a preferred implementation, the backend 106C may have a presentation layer 110A that interfaces with each user of the system, a network layer 110B that handles the well-known and understood network logistics such as load balancing and firewalls, a business layer 110C and a data layer 110D that implement the main processes of the digital marketing system. Each of the layers may be implemented using Amazon web systems (AWS) elements. It is understood that the system and method described below are in no way limited to the architecture shown in FIG. 2. As shown in FIG. 2, each user (using an application, mobile application or PWA on a computing device 102) may display a piece of live television broadcast that the sponsored by at least one sponsor and interact with the backend 106C through the presentation layer 110A. When the user expresses an interest in a particular piece of sponsored live television content (or a particular portion of the live television broadcast) being broadcast, the PWA or application may generate data that is sent to the backend system 106C that identifies the interest that occurred during the live television broadcast. The data for each user as a result of the interaction with the backend 106C may be passed onto the network layer 110B that has the well-known load balancer and firewall (provided by AWS) that are not described further here. The business layer 110C may contain the various plurality of lines of code/instructions that perform the processes of the backend 106C discussed below with reference to FIG. 5. The data layer 110D may store the data used by the backend 106C including user data, data about each broadcast, such as playlist, data about the URL/links to content interacted with by a user and other content.

Each broadcast system 106A may broadcast a live television broadcast. For example, during a large live sporting event, that live sporting event may be broadcast in different regions by a different broadcaster. The sponsor system 106B may be a sponsor for each broadcast of the live television by each broadcaster and the sponsor system 106B or each broadcaster 106A shown in FIG. 1 may interact with the personal ad backend system 106C using an application programming interface (API) wherein each has its own unique key. In one embodiment, there may be an allocated unique key per broadcaster/station or per sponsor that may be stored in multiple apps/PWAs for each sponsor or each station has its own unique identifier so that, for example, there could be a BBC radio scanner, but they have about 15 radio stations. The system may include two different implementations of how the personal ad backend system 106C determines that the live television broadcast is occurring (a set of timestamps) and then selects and delivery sponsor endpoint destinations during the live television broadcast. In a first implementation, a start and end time of the live television broadcast is determined by the personal ad system 106C [novel process? Or just due to the fact that it is a live broadcast] without a playlist of the broadcaster so that the personal ad system 106C can detect expressed interested by the user, select an endpoint destination of the sponsor.

In a second implementation to determine the set of timestamps, each broadcast system 106A may have a key, such as an API key, that allows the broadcast system 106A to interact with the personal ad backend system 106C. In one embodiment, there may be an allocated unique key per broadcaster/station that may be stored in multiple apps/PWAs, but each station has its own unique identifier so that, for example, there could be a BBC radio scanner, but they have about 15 radio stations. In order to implement the content interacting system provided by the backend 106C, each broadcast system 106A using the key may upload the program/playlist for the particular broadcast system and its broadcast of the live television event as well as the active broadcasts and the archive broadcasts. Using the API key, each piece of broadcast sponsored content may have a time marker to denote the beginning of the program and a monitor within the app/PWA to determine when a live broadcast is paused. The time marker may be located in the file itself that the API key will identify. Through the app/PWA, the system knows the name of the recorded file/program and when each element of the broadcast starts and ends in granular detail (e.g. adverts, interviews, commentary, music etc.) or knows the start and end times of a live televisional event, such as a live sporting event.

The personal ad system 106C may, based on a plurality of pieces of content, ads, etc. provided by the sponsor, change the endpoint destination to be provided in response to the expressed interest of the user periodically during the live television broadcast based on an event associated with the live television broadcast. The event associated with the live television broadcast may be an event during the live broadcast, such as a scoring event (goal, touchdown, try, runs) in a sporting event or any other event and/or an elapsed period of time in the live broadcast. For example, the system may change an offer of a discounted beer from the sponsor to an offer of a free sponsor beer when a team scores a goal during a live sporting event. This change may occur while a user with his app is in a bar watching the game. As another example, the system may change, after an elapsed period of time, from an offer for a first particular type of nuts from the sponsor to a second different type of nuts from the sponsor. This dynamic selection of the endpoint destination results in a user being exposed to more/different sponsor products/services or different offers during the live television broadcast. In addition, the system may change the endpoint destination based on the particular event that occurs during the live television broadcast so it may offer two different types of been from the sponsor depending on which team scores during a live sporting event.

Figure 3:
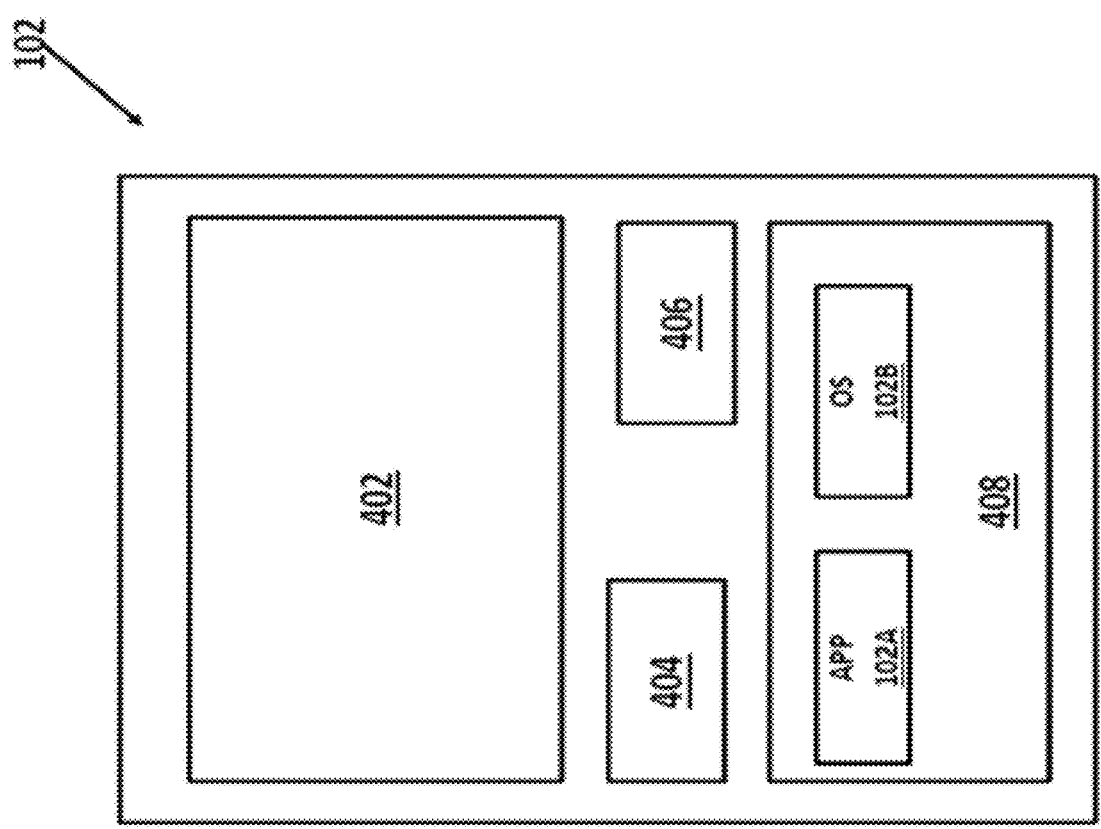
FIG. 3 illustrates more details of the computing device shown in FIG. 1.

FIG. 3 illustrates more details of the computing device 102 shown in FIG. 1 that has a display 402, a processor 404, connectivity circuits 406 and memory 408 that are connected together as is known in the art. Each computing device may also have the app 102A and an operating system 102B that reside in the memory 408 and have a plurality of lines of instructions/computer code that are executed by the processor 404 of the computing device 102. The functions and operations of the app 102A are described above. As described above, the app 102A may be a progressive web app (PWA) that is a web application that can be saved to the homescreen of the computing device. A PWA is a known technology that is described in more detail at //developers.google.com/web/progressive-web-apps/ and //en.wikipedia.org/wiki/Progressive_Web_Apps, both of which are incorporated herein by reference. The app may also be an application downloaded to the computing device. While the computing device 102 and the PWA are known technology, the disclosed radio personalized offer system and method using the computing device and PWA are not known in the marketing or digital marketing industry. Each computing device 102 may also have an input device, such as a touchscreen, keyboard, mouse, etc. that allows the user to interact with the computing device 102 and the app 102A to, for example, indicate a piece of content of interest in the broadcast and select one of the one or more personalized offers provided to the user.

Figure 4:
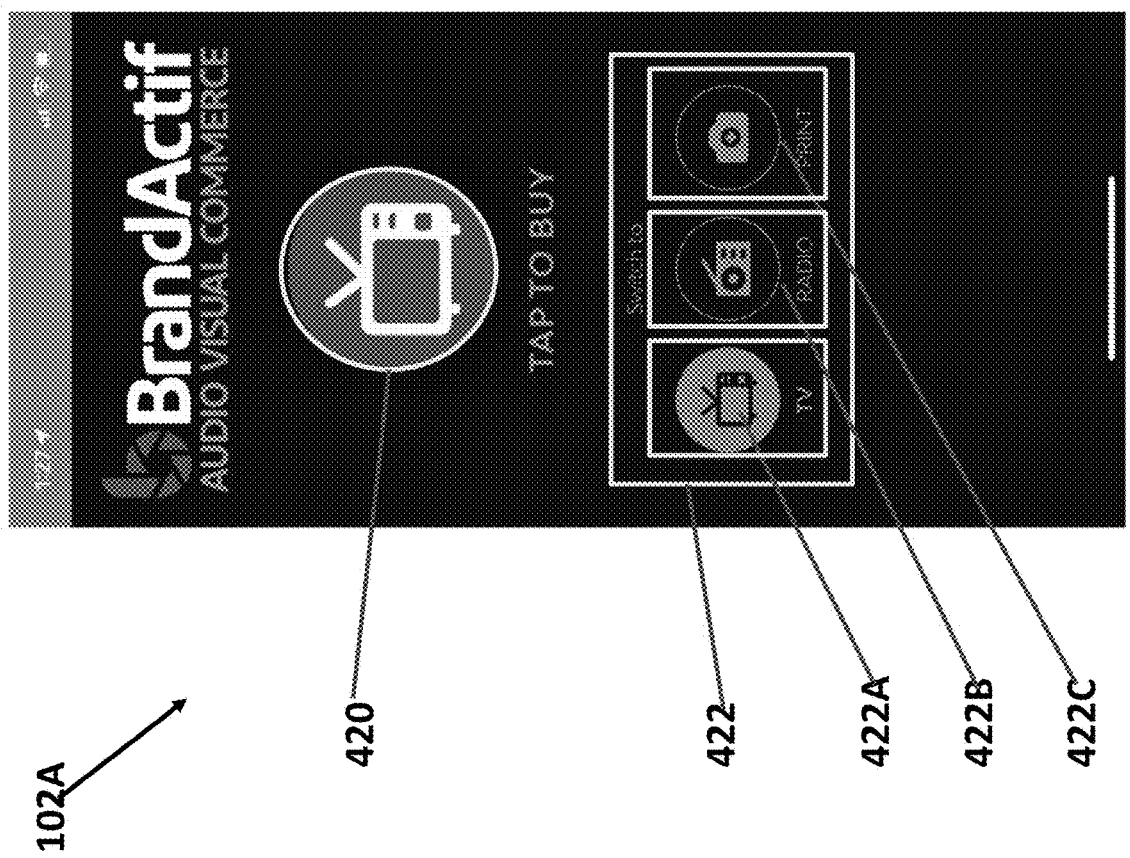
FIG. 4 illustrates an example of a user interface for the app executed on a computing device of a user.

FIG. 4 shown an example of a user interface of the app 102A that may be displayed on the display of the computing device 102. In this example, Brandactif is the sponsor that is providing ads, content, location of content that Brandactif wants to have provided to a user that expresses an interest using the app 102A. The user interface of the app 102A may have an icon 420 that may be tapped by the user (when the computing device has a touchscreen) to indicate an interest in the live television broadcast. The user interface of the app 102A may further have a broadcast selection portion 422 that allows the user to select the type of communications/broadcast (television 422A, radio 422B or print 422C) that the user is interacting with at a particular time. For example, for a live sporting event that is broadcast live on television and on radio, the user is able to use the app 102A (branded for the sponsor) to interact with the broadcast/communication in each or both mediums and receive an endpoint destination from the system on behalf of the sponsor. Furthermore, if a live broadcast has multiple sponsors, such as Coca-Cola® and Emirates® Airlines for the World Cup, the app 102A may be co-sponsored by both sponsors and the user can receive content from both sponsors or the user may have a different branded app 120A for each sponsor for the event.

Figure 5:
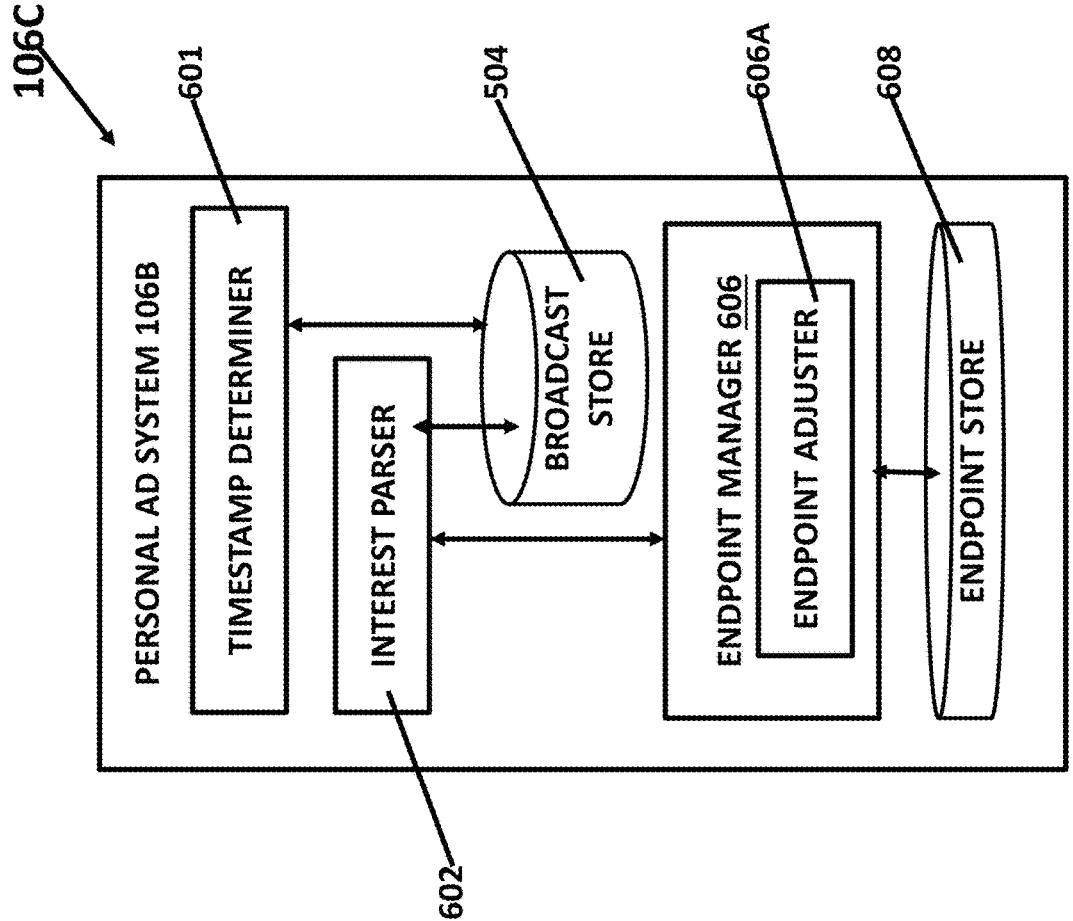
FIG. 5 illustrates more details of the personal ad system shown in FIG. 1.

FIG. 5 illustrates more details of the personal ad system server 106C shown in FIG. 1. The personal ad system 106C may include one or more computing resources, such as a server computers, blade servers, cloud computing resources, etc. and may further include a timestamp determiner 601 that determines a set of timestamps (including start and end times for the live television broadcast) using the two different techniques discussed above. Furthermore, the system may determine a set of timestamps for other trigger events including a halftime of a game, a timeout during a game, injury time for certain sports, etc. In one embodiment, each of the trigger events may be determined by scanning the live television broadcast (monitoring the voice of the commentators for words indicating an start or end of a trigger event) and extracting each of the trigger events and their duration. In other embodiments, the system may access an application programming interface (API) or APIs that provide sporting event scores and live commentary for many sports in order to determine the set of timestamps for the trigger events in the sporting event. Examples of the APIs may be: programmableweb.com/api/unofficial-sofascore-rest-api-v1, sofascore.com/, or statsperform.com/opta-feeds/. The set of timestamps for each trigger event, among other things, determines when an endpoint destination for the trigger event is active (can be interacted with by the user) or inactive (trigger event is over and the endpoint destination is not active.)

The personal ad system 106C further may include an interest parser 602 that receives an indication of interest for a particular piece of content from a user watching/listening to the broadcast using any device or with the app/PWA when the end point destination for the particular piece of content is active (since the interest occurs during a period between the start time and end time of the live television broadcast) and, using timestamping and a broadcast store 504 in one embodiment, determines, for each user, the end point destination identified by the user in each broadcast signal. In one embodiment, if the user expresses an interest in a trigger event, but the endpoint destination for the trigger event is inactive (the trigger event is completed or the time has expired), the system may provide an endpoint destination to a failover URL. The system 106C also may have an endpoint destination manager 606 that receives the determined interest for each user and, using an end point destination store 608, selects the one or more end point destinations that may be returned to the user. In one embodiment, each sponsor may have its own set of offers that may be selected for each broadcast of the live televisional broadcast. For example, the sponsor may have a different set of content to send to user of a Spanish language broadcast than to send to a German language broadcast, etc. The endpoint destination manager 606 may also have an endpoint adjuster 606A that adjusts the endpoint destinations selected for a user based on an event associated with the live television broadcast as described above.

Figure 6:
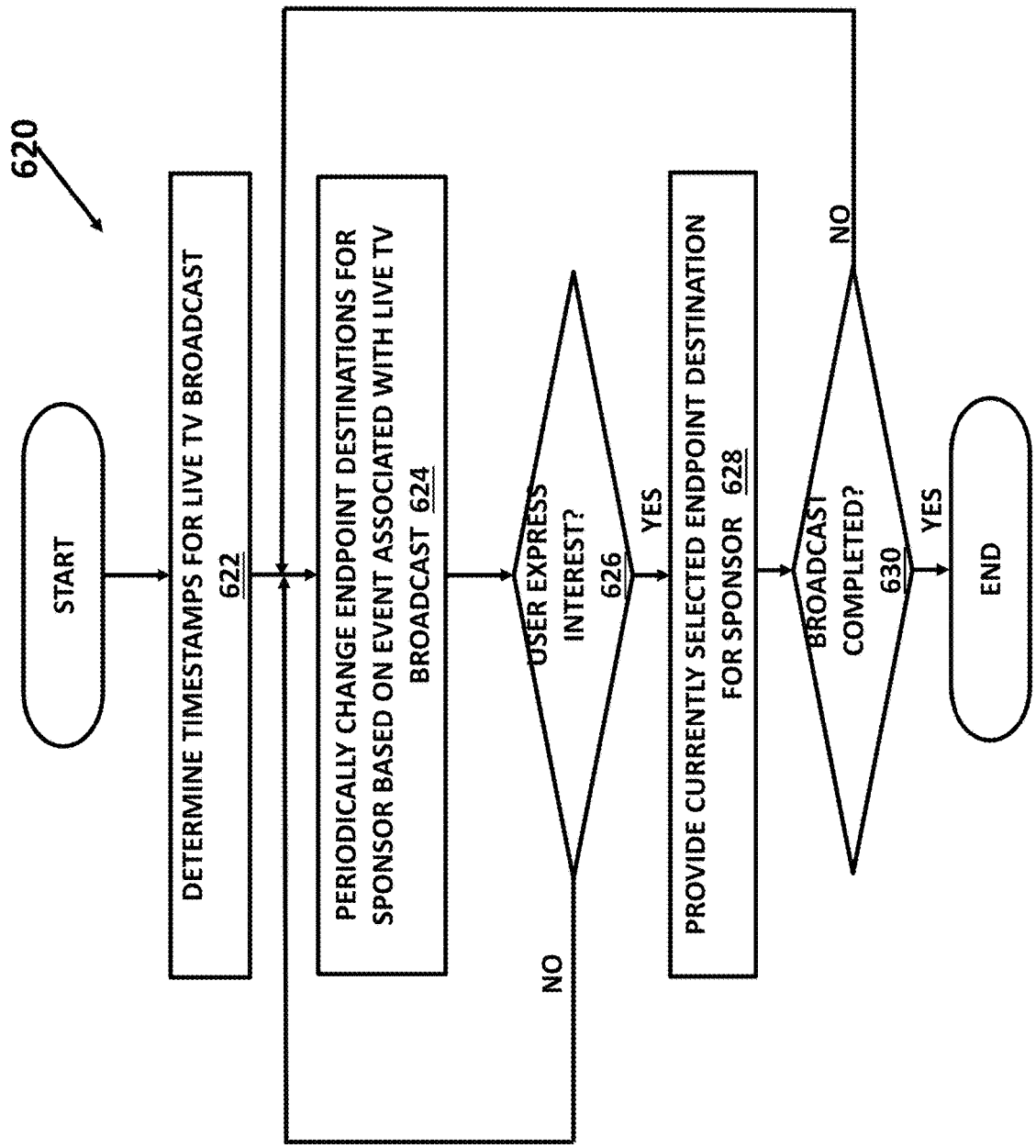
FIG. 6 illustrates a method for digital marketing for a sponsor of a live television broadcast in which timestamps for the live television broadcast may be determined by a personal ad system.

FIG. 6 illustrates a method 620 for digital marketing for a sponsor of a live television broadcast in which timestamps for the live television broadcast may be determined by a personal ad system. In this embodiment, the personal ad system determines the set timestamps from the live broadcast (622) without the need to use a playlist of the broadcaster/station since the start and end times for the live television broadcast and each trigger event in the live television broadcast are determinable as described above.

As described above, the personal ad system may periodically change each endpoint destination for a sponsor selected for each user based on an event associated with the live television broadcast (624). The event associated live television broadcast may be an event in the live broadcast, such as a scoring event in a live sporting event or an elapsed time of the live television broadcast. In the live sporting event example, the event may be a goal (soccer), a touchdown or field goal (football), a run (baseball or cricket), a try (rugby) (collectively the scoring event).

The system may determine if the user has expressed an interest (626) (by determining that the user interacted with the app 102, such as by tapping the icon on the app 102A (an example of which is shown in FIG. 4)) and then determining that the user interaction occurred during the time during which endpoint destinations for the live broadcast event are active using the set of timestamps. If the user has not expressed an interest, the method loops back to the process of periodically changing the endpoint destinations. If the user has expressed an interest during an active endpoint destination time, then the system may select and provide the currently selected endpoint destination for the sponsor (628) to the user. The endpoint destination may be a pointer/link to a website, webpage, piece of content, etc. The method may then determine if the broadcast is complete (630) and loop back to the process of periodically changing the endpoint destinations if the broadcast is not completed. If the broadcast is completed, the digital marketing for the sponsor for the live television broadcast is complete and the endpoint destinations are inactive which means that the user interacting with the app 102A will be directed to the failover URL for the sponsor as described above.

An example of the above method would be a World Cup game in which one team scores a goal that causes the personal ad system to change the endpoint destination for a sponsor, such as Coca-Cola. In one example, the offer to the user (pointed to by the endpoint destination) was a free can of soda, but changes to a discounted or free 2 liter bottle of soda once the goal was scored. Thus, in this example, if the user expressed an interest on the app 102A, the user would be provided with an offer for a free/discounted 2 liter bottle of soda. In this same World Cup game, Emirates Airways is another client of the personal ad system and may similarly have a completely different set of offers provided to the user. When there is more than one sponsor that desires to provide offers to the user, each brand sponsor may have its own branded app 102A that must be used by the user or the user may have an app 102A in which the user can switch between brands similar to the way shown in FIG. 4 that the user can switch between the communication mediums.

Figure 7:
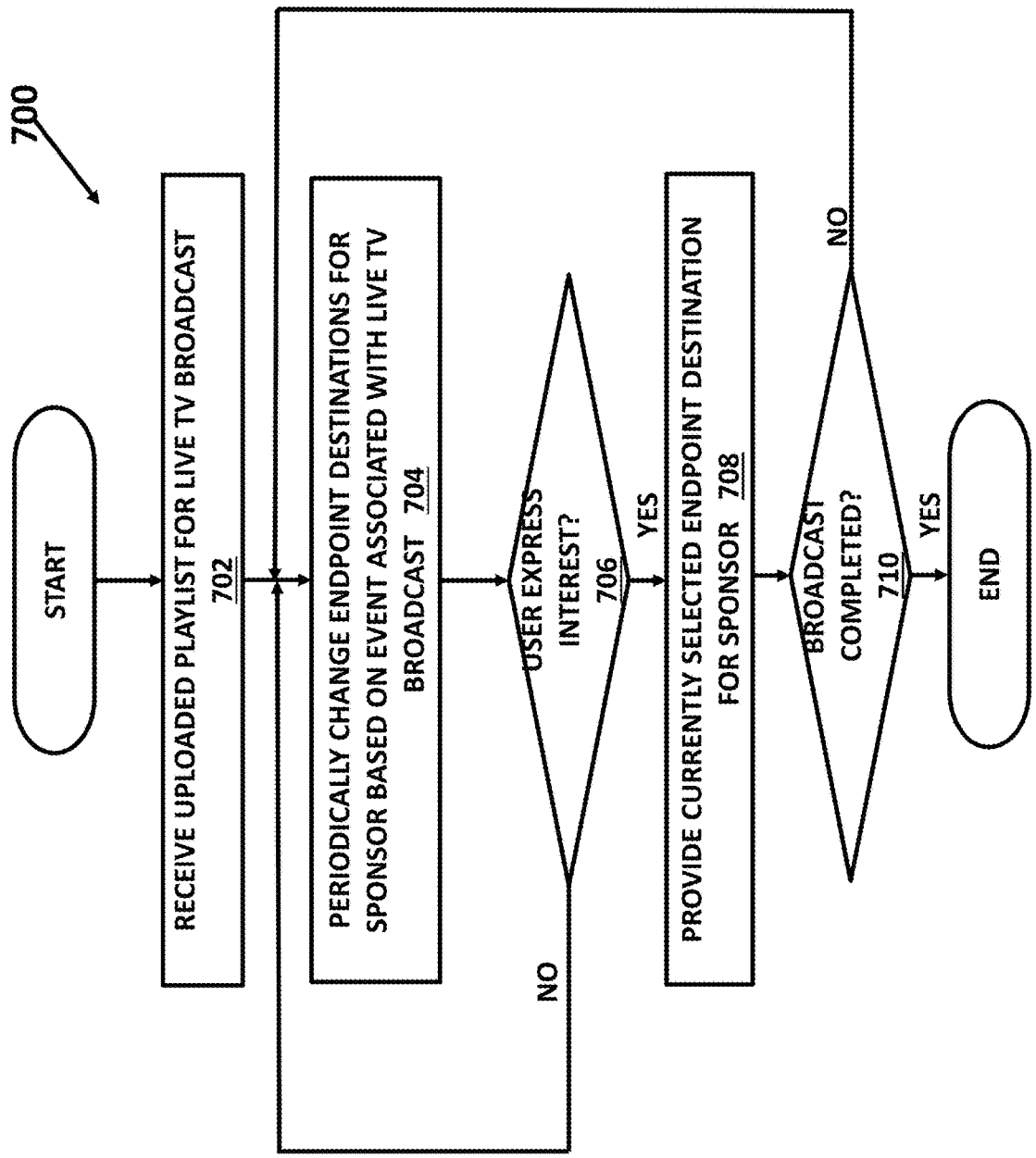
FIG. 7 illustrates a method for digital marketing for a sponsor of a live television broadcast in which the broadcaster uploads a playlist to generate timestamps for the live television broadcast.

FIG. 7 illustrates a method 700 for digital marketing for a sponsor of a live television broadcast in which the broadcaster uploads a playlist to generate timestamps for the live television broadcast. In this embodiment, the personal ad system determines the set timestamps from the live broadcast (702) based on a playlist uploaded by each broadcaster/station for the live television broadcast. Similar to the above method, this method also determines trigger events (start and end) from the commentary words. As described above, the personal ad system may periodically change each endpoint destination for a sponsor selected for each user based on an event associated with the live television broadcast (704). The event associated live television broadcast may be an event in the live broadcast, such as a scoring event in a live sporting event or an elapsed time of the live television broadcast. In the live sporting event example, the event may be a goal (soccer), a touchdown or field goal (football), a run (baseball or cricket), a try (rugby) (collectively the scoring event).

The system may determine if the user has expressed an interest (706) (by determining that the user interacted with the app 102, such as by tapping the icon on the app 102A (an example of which is shown in FIG. 4)) and then determining that the user interaction occurred during the time during which endpoint destinations for the live broadcast event are active using the set of timestamps. If the user has not expressed an interest, the method loops back to the process of periodically changing the endpoint destinations. If the user has expressed an interest during an active endpoint destination time, then the system may select and provide the currently selected endpoint destination for the sponsor (708) to the user. The endpoint destination may be a pointer/link to a website, webpage, piece of content, etc. The method may then determine if the broadcast is complete (710) and loop back to the process of periodically changing the endpoint destinations if the broadcast is not completed. If the broadcast is completed, the digital marketing for the sponsor for the live television broadcast is complete and the endpoint destinations are inactive which means that the user is directed to the failover URL for the sponsor as described above.

An example of the above method would be a World Cup game in which one team scores a goal that causes the personal ad system to change the endpoint destination for a sponsor, such as Coca-Cola. In one example, the offer to the user (pointed to by the endpoint destination) was a free can of soda, but changes to a discounted or free 2 liter bottle of soda once the goal was scored. Thus, in this example, if the user expressed an interest on the app 102A, the user would be provided with an offer for a free/discounted 2 liter bottle of soda. In this same World Cup game, Emirates Airways is another client of the personal ad system and may similarly have a completely different set of offers provided to the user. When there is more than one sponsor that desires to provide offers to the user, each brand sponsor may have its own branded app 102A that must be used by the user or the user may have an app 102A in which the user can switch between brands similar to the way shown in FIG. 4 that the user can switch between the communication mediums.

In the playlist embodiment, one or more playlists are uploaded by the broadcaster/station that may be used by the personal ad system to generate the set of timestamps that are used to determine when an endpoint destination is active (available to be interacted with by the user since the broadcast content is being broadcast) or inactive. FIGS. 8A-8C illustrate examples of the program/playlists of a broadcast system that may be uploaded by the broadcast system or station. Each playlist program may have one or more piece of content being broadcast and then one or more advertisements/articles/discussions/promotions/sponsor messages that the user can interact with as described below in more detail. FIG. 8A shows a playlist 802 for a music type broadcast system in which one or more songs (S1, S2, . . . , SN) are broadcast along with one or more advertisements (A1, A2, . . . , A3) over a predetermined time of the playlist. In the playlist 802 a start time and an end time for each song and each advertisement is specified so that, for example, the first song starts at t0 and ends at t1 and the first ad starts at time t1 and ends a time t2, etc. Each time in the playlist may be measured in milliseconds. FIG. 8B illustrates a playlist 804 for a talk radio broadcast system that has one or more discussions (D1, . . . , D2) and one or more promotions (P1, . . . , P2) in which the start and end times of each piece of content is known down to the millisecond. FIG. 8C illustrates a playlist 806 for national public radio broadcast system that has one or more pieces of content (C1, . . . , CN) such as news stories or discussions and one or more ads (A1, . . . , A2) in which the start and end times of each piece of content is known down to the millisecond. Note that the backend system 106C allows a user to indicate an interest in the ads, the discussions, the stories, the songs, the promotions, etc. . . . In each of the playlists, each piece of content, such as the songs and ads in FIG. 8A, is a discrete piece of content that has a start time and an end time.

Using the playlists/programs for each broadcast system 106A, each piece of content being broadcast is identified (including its start and end time) so that each piece of content can be associated/linked to an end point destination and thus each piece of content in the broadcast becomes clickable by the user by interacting with the backend 106A. Thus, all of the broadcast content (including archive content) becomes clickable by a user. In more detail, each piece of clickable content in the broadcast is synchronized with an end point destination (a URL or in-app content) associated with the particular piece of content. For example, an ad for a new Ford Mustang car may have an end point destination that directs the browser of the user to a website with details of the new Ford Mustang car. Alternatively, a new story about a volcano in Ethiopia may had an end point destination for a travel site to book travel to the Erta Ale region in Ethiopia. Each end point destination may be synchronized to be available to the user to select between the start time and end time of the piece of content in the playlist associated with the end point destination. Thus, the backend 106B is able to provide the end point destinations for the pieces of content based solely on the time when the user expressed their interest in the piece of content. For example, if a particular piece of content was broadcast from 10:00 AM to 10:05 AM and the user expresses an interest at 10:03 AM, the backend 106B knows that the user is expressing an interest in the particular piece of content. Once a particular broadcast system's playlist(s) are loaded into the backend system 106B, a user may interact with the broadcast system content as described above. The system, due to the playlist, has millisecond precision about when to activate a particular end point destination (when the piece of content, ad, promotion, etc. starts being broadcast) and when to deactivate the particular end point destination (when the particular piece of content's broadcast has ended.) In this manner, the content sent to the computing device of the user (and the app or PWA) is in sync with the live broadcast based on the playlist timing sequences. The system can also handle the playlist being out of synchronization with the live broadcast such as when, for example, an interview last longer than scheduled. In this case, a time correction shift can be performed manually or automatically in real time using various techniques, such as for example audio recognition, to re-synchronize the playlist with the live broadcast.

In the methods shown in FIGS. 6 and 7, the user may view/interact with the live television broadcast in any manner. In one embodiment, the user may use a television app (that may be part of the app 102A or a separate app) to view the live television broadcast or may display to the live television broadcast using a separate device like a televisional, streaming device, etc.

While listening to the broadcast, the user may view a portion of the live television broadcast that is "interesting" to the user. For example, the user may hear an advertisement for a particular entertainment experience, such as a baseball game/team. The user may indicate their interest in the piece of content in the broadcast as described above and, in one embodiment, the user may use the app/PWA app 102A to indicate the interest in the piece of content and may click on an icon in the app (an example of which is shown in FIG. 4).

The interest by the user may be communicated over the communications path 104 to the backend digital marketing system 106C. As described above, for this broadcast system, the backend digital marketing system 106C has the playlist for the broadcast with the different pieces of content (or has determined the set of timestamps ad described above) and has one or more endpoint destinations for the sponsor wherein the backend 106C can change the endpoint destinations periodically as described above. In some embodiments, the application/PWA 102A stores metadata about the user and the computing device (time, SKU, location, handset, language, version, OS, browser etc.) so that the system may serve content personalized/relevant to each user if such content is available from the sponsor/end point destination. For example, if the user indicates his interest in a particular product that is part of the broadcast at a particular location near a store for the product (known from the metadata), the application/PWA 102A can direct that particular user to the store for the product thus increasing the foot traffic at the store. Thus, the backend may provide the end point destination to the user back to the computing device. In some embodiments, the application/native application may store the database of content and end point destination associations (instead of being stored in the backend) and thus select the end point destination for a particular piece of content.

The user may then interact with the end point destination and receive information about the service or product or piece of content. In one embodiment, the user can purchase a product or service based on the end point destination using the radio station app/PWA 102A. For example, the user may be watching the live television broadcast for a national broadcast and a sponsor advertisement is broadcast for a particular product. The user can express an interest in the advertisement and the product and the application/PWA 102A may direct the user straight to that product on the brand/retailer's website/app. Furthermore, based on the metadata captured via the computing device, the application/PWA can inform the user of the nearest store for the particular product based on the GPS positioning of the current location of the computing device when the user expressed the interest in the product.

In some embodiments, the app 102A may be distributed by (or on behalf of) the sponsor and may have a single icon for each user that each user can customize via the computing device app 102A. In one commercial embodiment, the app 102A may be a 'RaydioActif' app. In another embodiment, each car manufacturer may already have its own app in Car Play/Auto and the personalized offer functionality may be added into that existing app and the car manufacturer may do the deals with the local country radio stations for a revenue share. The above embodiment provides a completely new revenue stream for the auto industry.

Figure 9:
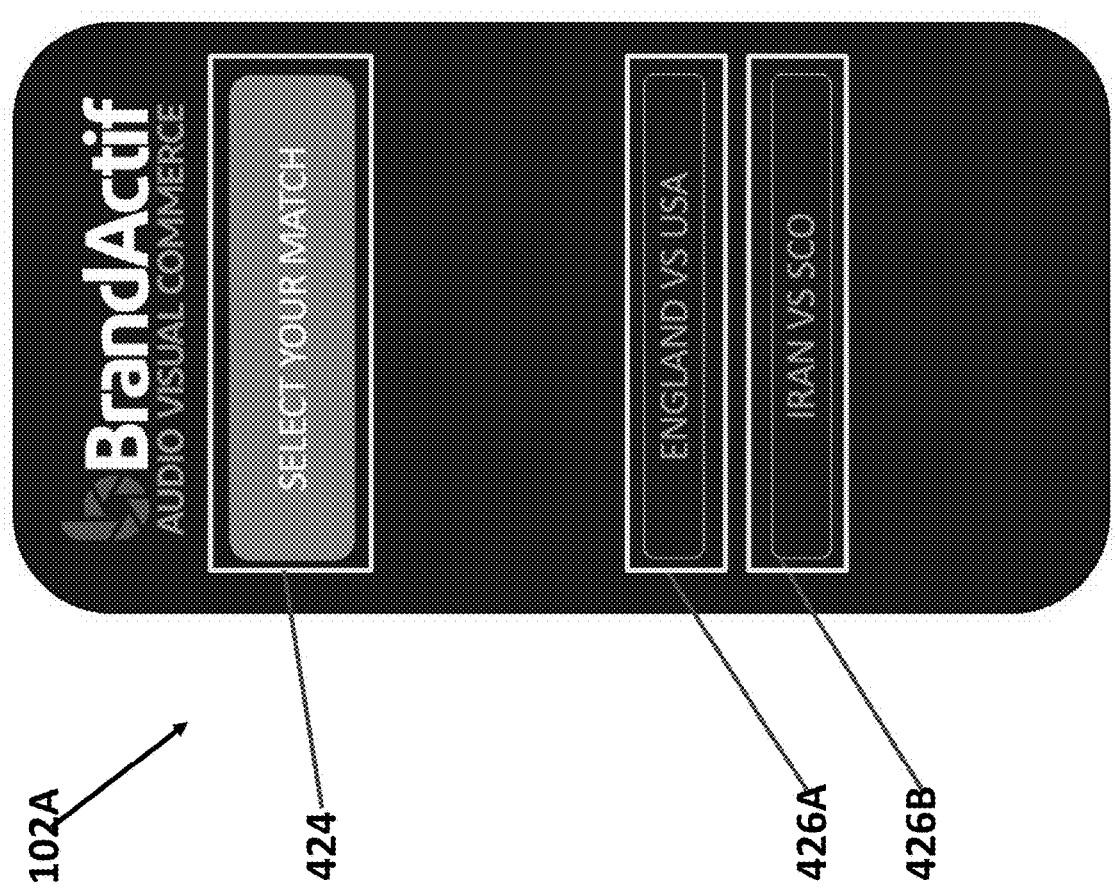
FIG. 9 illustrates an example of a user interface for the app executed on a computing device of a user when the live broadcast has multiple events occurring.

FIG. 9 illustrates an example of a user interface for the app 102A executed on a computing device of a user when the live broadcast has multiple events occurring. For example, during a tournament, multiple sporting events may be occurring at the same time. As a result, the user interface of the app 102A may include a match selection portion 424 that allows the user to select the match of interest since the offers and endpoint destinations from the sponsor may change based on the match selected. Thus, in the example in FIG. 9, the user may select an England v. USA match 426A or an Iran v. Scotland match 426B. This additional user interface in FIG. 9 permits the digital marketing system to be used with events with multiple matches occurring at the same time in which, as described above, the trigger events for each match are determined so that the sponsor can provide personalized offers to the users based on the trigger events.

Use Cases for Broadcast System and Method

The broadcast system and method may be used for various different types of content that may each have an end point destination for the sponsor associated with the piece of content. For example, the live television broadcast may include a sponsor product placement in which the end point destination allows the user to tap/select for further information or to buy the product. The portion of the live television broadcast may also be advertising/clickable advertising in which the end point destination allows the user to tap/select for further information or to buy the product of the sponsor. In various embodiments of the above methods, the sponsor may be an airline, a beverage (alcoholic or non-alcoholic) maker, a consumer product or service provider (apparel or credit cards, for example) or an non-fungible token (NFT) provider. The use case for each of the sponsors may be different and an example of each use case in which the sponsor uses an app or has its own app that incorporates the technology is provided with the example live television broadcast event being a live sporting event that has trigger events including halftime/intermissions/tea breaks, scoring events, added time and/or extended time due to a tie.

Airline Sponsors

When the sponsor is an airline, the sponsor has quite a bit of information about a user including home address, nationality, passport number, airline rewards level, etc. ("user information"). The user information of the airline allows the airline to target products and services to particular clients/users of the airline. For example, in the context of the World Cup, if a user is a fan of England and England scores a goal and improves its chances of making the knock-out round of the World Cup tournament, the airline, if the user expresses an interest when England scores, can provide an offer for a ticket to the knock-out rounds and/or a package with a flight, hotel and tickets for the knock-out round games. As another example, if the user is a citizen of Brazil, but living in London presently, the airline may have an offer for that user, for a flight back to Brazil to watch his team during an important game. Thus, in the airline sponsor use case, the offers (and the corresponding endpoint destinations) may be more targeted to a particular group of users or a particular user due to the airline's user information.

In the airline sponsor example, the airline may have a sponsor deal with a team/club, such as Dubai-based Emirates® (sponsoring Real Madrid®, Arsenal®), Qatar Airways® (sponsoring FC Barcelona®, AS Roma®), Etihad Airways® (sponsoring Manchester City®). Additionally, Qatar Airways® may be involved in many major football sporting events this year since they are the Official Sponsor and Official Airline Partner of FIFA and the upcoming FIFA World Cup Qatar 2022. In North America, many airlines hold sponsorships with numerous teams. For example, American Airlines® serves as the title sponsor for the Dallas Mavericks® and Dallas Stars®' American Airlines Arena while United Airlines® holds the naming rights for the Chicago Bulls® and Chicago Blackhawks®' United Center®. Meanwhile, the Super Bowl® has been a marquee event for brands to activate commercial spots. Last year's Super Bowl® in Miami saw Turkish Airlines® host a powerful advertisement aimed at the approximate 40% of Americans who have never traveled abroad. Airlines as sponsors can work with the Rights Holders/Teams to educate the fans to tap for special deals during the match with 'trigger events' such as TDs, to get offers such as discounted flights to the next away match, priority seat upgrades for being a fan, win VIP experiences after 4 flights etc.

Beverage Sponsors

When the sponsor is a beverage manufacturer, the sponsor may have less user information than the airline, but may still provide offers and may provide immediate product offers that are not possible for the airline. For example, a beer sponsor may, when a team has a scoring target event, provide a 2 for 1 beer offer to each user who expresses the interest. Since a beverage manufacturer may make a different beverage or a beverage with different packaging for different countries, the beverage sponsor may have offers (and the corresponding endpoint destination) for different beverages or beverages with different packaging for different countries in which a user may reside. As another example, the beverage manufacturer may provide a certain type of beverage offer depending on the team supported by the user (based on the expressed interest of the user.) As yet another example, a beer sponsor, such as Budweiser®, can send Point of Sale (POS) merchandise to its bar network with promotions on beer mats, posters etc. with Call to Actions such as 'go to tap.bud.com/nameofbar to get 2 for 1 offers after every touchdown'. The coupons may be automatically generated, limited if necessary to each handset/max per day per bar etc. In this example, both Bud and Bar owner can promote. For the beverage sponsor, the offers can be regionally differentiated so a different city, such as Pittsburgh, gets local team promotions/offers.

Consumer Product/Service Sponsors

When the sponsor is a consumer product/service provider, the sponsor may have less user information than the airline, but may still provide offers and may provide immediate product offers that are not possible for the airline. For example, depending on team supported by the user with the expressed interest, the sponsor may offer a discount on a piece of apparel or a particular credit card based on the country of the team.

In the credit card/insurance sponsor example, a credit card/insurance company may have a sponsorship deal with a sporting event league, like MLB®, that allows co-marketing to make viewers of games aware of special deals available during match day and beyond. This type of activation is also known as Performance Marketing with a new twist. In particular, the digital marketing system can determine a particular sporting event being watched by a user and could therefore enable offers targeted specifically for that team. For example, the offer may be "buy team 'A' merchandise with your Visa Card and get special discounts". This could be jointly established with Fanatics, the leading merchandise provider for many sports. The offers of merchandise may be different from different teams and/or for different months of the year such as offers for jackets and beanies during the colder months of the year.

In the sports apparel consumer product sponsor example for a sporting event, brands such as Nike®, Puma®, Adidas® and Fanatics® that controls team merchandise for a lot of sporting events and teams, are huge sponsors. While a game/sporting event is being played, the apparel sponsor could use trigger moments (trigger events) for offers. For example, when a player/team member who is sponsored by the apparel sponsor scores, the user can express interest on the apparel sponsor's app for an amazing deal on a piece of apparel being worn by the player. The system could also offer contextualized and/or personalized videos for the user who expressed interest where the video uses team/player imagery that can be sold as NFTs.

NFT Sponsor

When the sponsor is an NFT provider, the sponsor may have less user information than the airline, but may still provide offers and may provide immediate product offers that are not possible for the airline. For example, the NFT provider may, when the user expresses an interest, provide an offer to participate in an auction for the NFT to the user. The NFT that may be bid on by the user may be an NFT that is chosen based on the expressed interest of the user.

Telco Sponsor

Another example of a sponsor is a telecommunications (telco) companies in various countries like BT, Vodafone®, T-Mobile®, AT&T®, Verizon, etc. Each telco sponsor could have/encourage users tap on the app as described above while watching a sporting event/game and the telco may provide personalized offers for telco products or services that may include Broadband offers, new handset offers, gamification promotions, etc.

The foregoing description, for purpose of explanation, has been with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include and/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general-purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software, and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

What is claimed is:

1. A method, comprising:
   receiving, at a backend system, a set of timestamps for a piece of sponsored content in a live television broadcast, the set of timestamps indicating a time during the piece of sponsored content that a user is able to express an interest in a trigger event in the piece of sponsored content, the piece of sponsored content having at least one sponsor that sponsors the piece of sponsored content;
   accessing and storing, at the backend system the set of timestamps for the piece of sponsored content and storing a plurality of endpoint destinations for the piece of sponsored content, each endpoint destination being a pointer to further digital information about a sponsor product or service associated with the trigger event in the piece of sponsored content;

periodically, during the broadcast of the piece of sponsored content, selecting an endpoint destination based on the trigger event in the piece of sponsored content wherein the endpoint is selected from the plurality of endpoint destinations;

receiving, from an app during the live television broadcast wherein the app is associated with the sponsor and executed on a computing device separate from a device that displays the piece of sponsored content, an expression of interest in the piece of sponsored content;

identifying, at the backend system, the trigger event and the selected endpoint destination associated with the expression of interest and verifying that the expression of interest occurred at a particular time during the piece of sponsored content that the user is able to express the expression of interest; and communicating, by the backend system, the selected endpoint destination for the piece of sponsored content.

2. The method of claim 1, wherein periodically selecting the endpoint destination for the trigger event further comprises periodically selecting an endpoint destination when the trigger event occurs during the piece of sponsored content.

3. The method of claim 1, wherein periodically selecting the endpoint destination further comprises periodically selecting an endpoint destination after a predetermined elapsed time in the piece of sponsored content.

4. The method of claim 1, wherein the piece of sponsored content is a live sporting event.

5. The method of claim 4, wherein the trigger event in the live sporting event is a goal in a soccer game.

6. The method of claim 5, wherein the live sporting event is a World Cup game.

7. The method of claim 4, wherein the trigger event in the live sporting event is a touchdown in a football game.

8. The method of claim 1 further comprising determining the set of timestamps for the piece of sponsored content by uploading, by the television broadcast system to the backend system, a play list for the station using a unique station identifier, the playlist having a start time and an end time for the piece of sponsored content used to determine the set of timestamps.

9. A system, comprising:

a computing device having a processor and an app executed by the processor;

a computer based personal advertising backend having a processor and instructions that are executed by the processor to cause the processor to:

access a set of timestamps for a piece of sponsored content in a live television broadcast, the set of timestamps indicating a time during the piece of sponsored content that a user is able to express an interest in a trigger event in the piece of sponsored content, the piece of sponsored content having at least one sponsor that sponsors the piece of sponsored content, store the set of timestamps for the piece of sponsored content and store a plurality of endpoint destinations for the piece of sponsored content, each endpoint destination being a pointer to further digital information about a sponsor product or service associated with the piece of sponsored content;

periodically, during the broadcast of the piece of sponsored content, select an endpoint based on the trigger event in the piece of sponsored content wherein the endpoint is selected from the plurality of endpoint destinations;

receive, from the app of the computing device during the live television broadcast wherein the app is associated with the sponsor and the computing device is separate from a device that displays the piece of sponsored content, an expression of interest in the piece of sponsored content;

identify the trigger event and the selected endpoint destination associated with the expression of interest and verify that the expression of interest occurred at a particular time during the piece of sponsored content that the user is able to express the expression of interest; and communicate the selected endpoint destination for the piece of sponsored content.

10. The system of claim 9, wherein the computer based personal advertising backend is further configured to periodically select an endpoint destination when the trigger event occurs during the piece of sponsored content.

11. The system of claim 9, wherein the computer based personal advertising backend is further configured to periodically select an endpoint destination after a predetermined elapsed time in the piece of sponsored content.

12. The system of claim 9, wherein the piece of sponsored content is a live sporting event.

13. The system of claim 12, wherein the trigger event in the live sporting event is a goal in a soccer game.

14. The system of claim 13, wherein the live sporting event is a World Cup game.

15. The system of claim 12, wherein the trigger event in the live sporting event is a touchdown in a football game.

16. The system of claim 9, wherein the computer based personal advertising backend is further configured to receive, from a television broadcast system to the computer based personal advertising backend, a play list for the station using a unique station identifier, the playlist having a start time and an end time for the piece of sponsored content used to determine the set of timestamps.

* * * * *